No. 643,362. Patented Feb. 13, 1900.
F. MOSS.
APPARATUS FOR MAKING FRUIT BUTTER.
(Application filed May 9, 1898.)
(No Model.) 2 Sheets—Sheet 1.
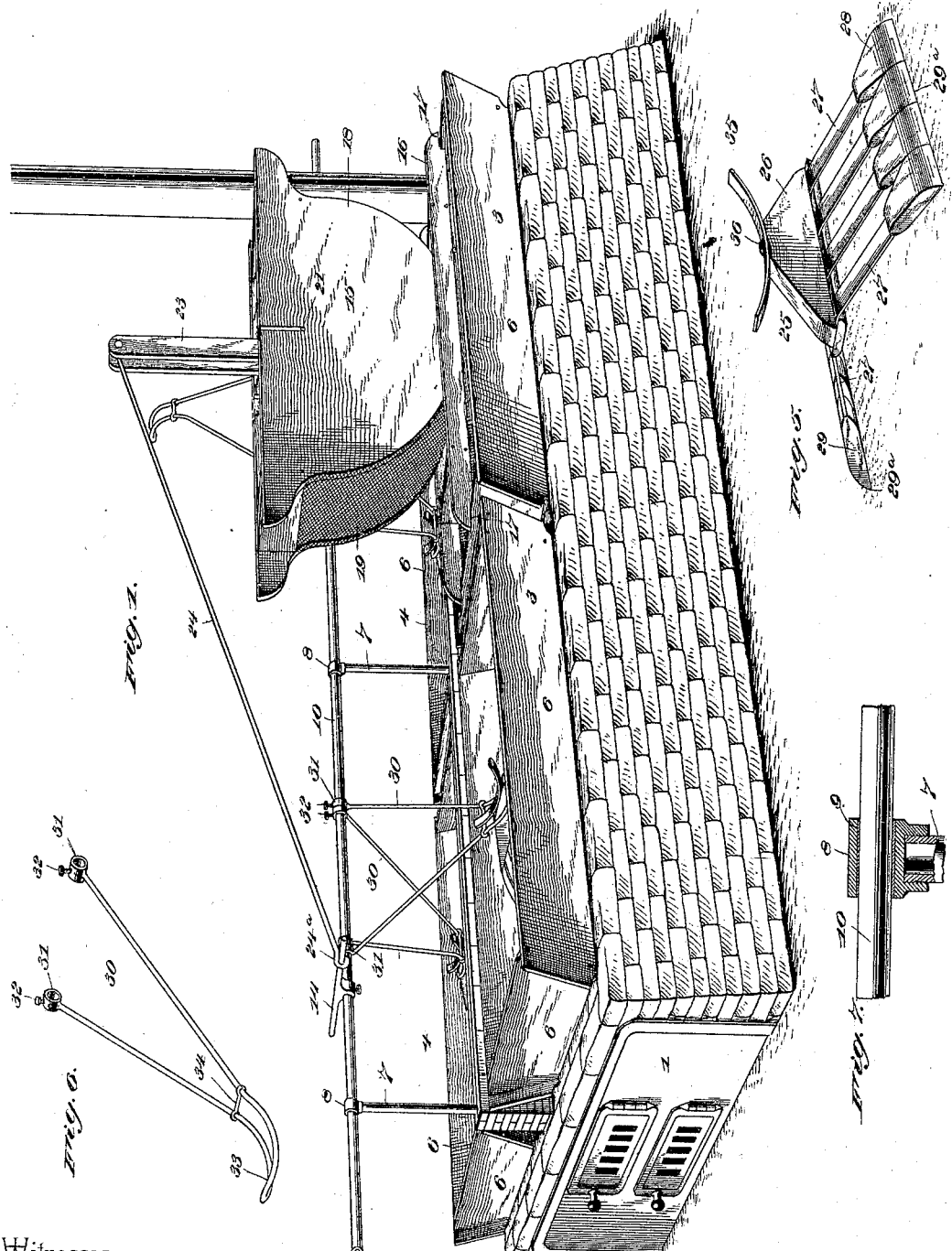

No. 643,362. Patented Feb. 13, 1900.
F. MOSS.
APPARATUS FOR MAKING FRUIT BUTTER.
(Application filed May 9, 1898.)
(No Model.) 2 Sheets—Sheet 2.
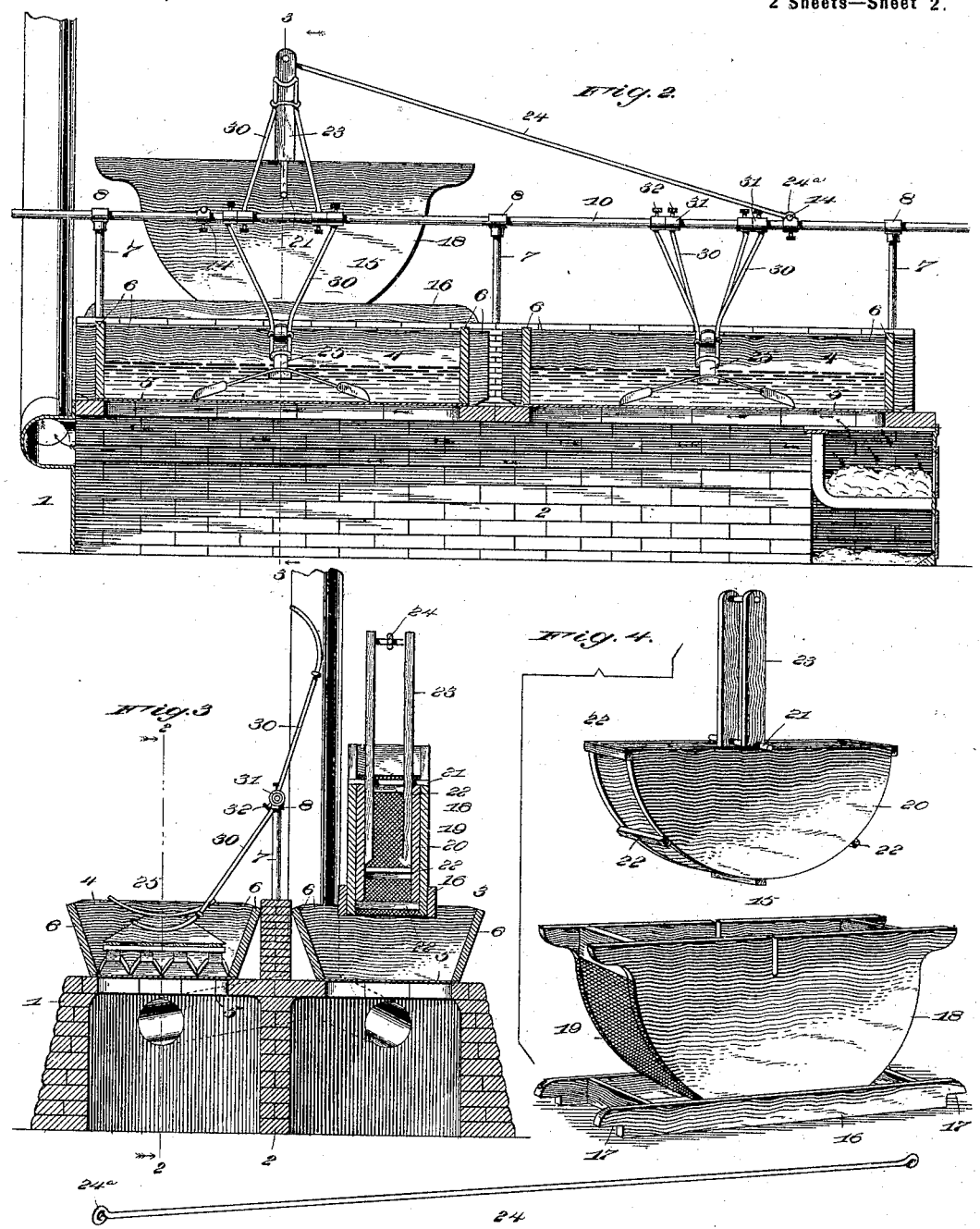

UNITED STATES PATENT OFFICE.

FLAVIUS MOSS, OF RUSSIAVILLE, INDIANA.

APPARATUS FOR MAKING FRUIT BUTTER.

SPECIFICATION forming part of Letters Patent No. 643,362, dated February 13, 1900.

Application filed May 9, 1898. Serial No. 680,178. (No model.)

*To all whom it may concern:*

Be it known that I, FLAVIUS MOSS, a citizen of the United States, residing at Russiaville, in the county of Howard and State of Indiana, have invented a new and useful Apparatus for the Manufacture of Fruit Butter, of which the following is a specification.

My invention relates to an apparatus for the manufacture of fruit butters; such as apple, peach, and other kinds of fruit butters; and the primary object that I have in view is to provide an apparatus by which a high grade of butter may be rapidly and economically produced, the butter being free from seed or congealed lumps and possessing a rich color.

A further object of the invention is to provide an apparatus in which the parts are readily accessible for adjustment and cleaning and the strainer and agitating-scrapers are operated by mechanical connections with a single driving-shaft.

A further object of the invention is to provide scrapers which may be brought into or thrown out of service, as may be required, and to construct and arrange the parts to secure the desired pressure of the scrapers upon the contents of the pan and the bottom thereof.

With these ends in view the invention consists in the novel combination of elements and in the construction and arrangement of parts which will be hereinafter fully described and claimed.

To enable others to understand the invention, I have illustrated the preferred embodiment thereof in the accompanying drawings, forming a part of this specification, and in which—

Figure 1 is a perspective view of an apparatus for the manufacture of fruit butter constructed in accordance with my invention. Fig. 2 is a longitudinal sectional elevation on the plane indicated by the dotted line 2 2 of Fig. 3. Fig. 3 is a vertical transverse sectional elevation through two of the pans, the strainer mechanism, and one of the agitating-scrapers, the plane of the section being indicated by the dotted line 3 3 of Fig. 2. Fig. 4 is a detail perspective view of the strainer mechanism with the parts thereof separated. Fig. 5 is a detail perspective view of the agitating-scraper. Fig. 6 is a detail perspective view of the carrying-arm for the scraper; and Fig. 7 is a detail sectional elevation of one of the standards, the shaft bearing thereon, and a part of the actuating rod or bar.

Like numerals of reference denote like and corresponding parts in each of the several figures of the drawings.

1 designates a furnace upon which is placed a series of pans in which the fruit butter is to be cooked. This furnace is shown as built of brickwork, and it is constructed with a central division-wall 2, which divides the furnace-chamber into two compartments, and this division of the furnace is designed to secure an equable distribution of the heat and products of combustion to the two series of pans, which are disposed on the furnace on opposite sides of said division-wall.

The series of pans on one side of the furnace are indicated at 3, while the other series of pans are indicated at 4 and located on the furnace at the side thereof opposite to the first-named pans 3. Any suitable number of pans may be used within the capacity of the apparatus, and in some cases I may employ only two pans, while in other cases the number may be increased to four, six, or eight. The number of pans used, however, is not material, and in the adaptation of the invention shown by the drawings I have illustrated but four pans, disposed in pairs on opposite sides of the division-wall 2. Each pan may be attached to or erected on the furnace in any suitable way, and in the embodiment of the pan shown by the drawings it consists of a metallic bottom 5, preferably of copper, and side and end walls 6, preferably of wood, although the particular materials used in the fabrication of the pan are not essential.

Erected vertically on the division-wall 2 of the furnace is a series of comparatively short standards 7, preferably of piping or tubing, which are set in the division-wall, and at the upper ends of these standards are provided shaft-bearings 8, which are in the same horizontal plane and aline or coincide with each other. As shown by Fig. 7 of the drawings, the shaft-bearings 8 are preferably formed by T-couplings which are rigidly attached to the tubular standards 7 and are provided with Babbitt-metal linings 9, constituting a bearing for a reciprocating bar. This reciprocating bar is indicated at 10 and arranged longitudinally of the furnace in a horizontal position over the bridge-wall 2. Said bar occupies a position between the two series of pans, and it is slidably fitted in the bearings 8, so as to contact with the Babbitt-metal linings therein, thus insuring freedom of play to the bar in an endwise direction. I prefer to make this bar of piping or tubing, although this is not essential, and said bar is operatively connected with a driving mechanism by which reciprocating motion is positively imparted thereto. In the drawings I have represented the means for driving the bar 10 as consisting of a driving-disk 11, provided with a crank-pin 12, to which is connected a pitman 13, the other end of which pitman is pivotally attached to one end of the endwise-movable bar 10, and this driving-disk 11 is adapted to be positively rotated from any suitable source of power—as, for instance, by gear connections with a cider-press or from a line of shafting—or it may be driven by hand or by a motor. If the driving-disk is to be rotated by connections with a cider-press, suitable reducing-gearing should be employed between the press mechanism and the driving-disk, so as to rotate the latter at a proper speed for actuating the bar or rod 10.

On the reciprocating bar 10 are secured a series of laterally-extending arms 14, which are arranged in pairs over two adjacent pans situated on opposite sides of the bridge or division wall 2 of the furnace, and these pairs of arms are spaced at proper intervals along the shaft so that the strainer device may be operatively connected with the bar 10 when fitted over either of the pans forming the two series of pans on the opposite side of the furnace division-wall. This strainer mechanism is indicated in its entirety by the numeral 15, and is shown by Figs. 1, 2, 3, and 4 of the drawings. The strainer mechanism is adapted to be fitted detachably to any one of the pans of the series for the purpose of straining the fruit-pulp before it is admitted to the pan, and in either of its adjusted positions over any one of the pans the movable element of the strainer is adapted to be connected with an arm 14 on the reciprocating bar 10, so as to be positively actuated thereby. This strainer mechanism consists of a horizontal frame 16, a receptacle 18, a strainer or screen-bottom 19, and a vibrating agitator 20. The horizontal frame 16 of the strainer mechanism consists of longitudinal rails united by cross-bars, and the ends of the longitudinal rails are notched to provide the seats 17, which are adapted to snugly fit the end walls of either of the pans. The frame 16 is long enough to span the pan, and as the pans are uniform in size the frame may be fitted to either of the pans at will. The receptacle 18 consists of properly-shaped side walls arranged in parallel relation and united rigidly together by cross-bars, and to the curved edges of the receptacle-walls is suitably secured the strainer 19, which is shown as formed of a piece of wire screen or other foraminous material. The agitator 20 of the strainer mechanism is hung on a pintle or rod 21 within the receptacle 18, thus mounting the agitator for its convex working face to move or vibrate close to the strainer-bottom 19 of the receptacle, and to increase the efficiency of the agitator its working edge is provided with a series of scraper-bars 22, adapted to act on the fruit-pulp deposited in the receptacle and to force the same through the strainer 19. The receptacle is mounted on the carrying-frame 16 to have a strainer 19 practically unobstructed by the frame, and the pulp as it is strained is free to pass directly into the pan upon which the strainer mechanism is for the time being mounted. The agitator 20 is provided with a lever-arm 23, which extends above the receptacle 18, and to the extremity of this arm is pivoted one end of an elongated pitman 24, the other end of which is provided with an eye $24^a$ or its equivalent, by which said end of the pitman may be detachably attached to one of the arms 14 on the bar 10.

The scraper and agitator for each of the pans is indicated by the numeral 25, and it will be understood that one scraper and agitator is provided for each pan. Suitable devices are provided for mechanically connecting the agitator and scraper with the reciprocating bar for the purpose of being positively moved over the surface of the pan-bottom, and such devices for actuating the scraper and agitator may be regulated to vary the pressure of the scraper upon the pan-bottom and also be adjusted to throw the scraper and agitator out of service, as may be desired. The scraper and agitator consists of a central head-block 26, a series of springs 27, and two series of shoes 28 and 29, attached to the opposite ends of the series of springs 27. The head-block is arranged centrally and transversely across the series of springs, and the latter are bowed or curved longitudinally, so as to raise the central portion of the scraper and the head-block above the working shoes 28 29. The springs are of the variety known to the art as "leaf-springs," and they are arranged in parallel relation to each other on the head-block, to which said springs are rigidly secured in any approved manner. The shoes 28 and 29 are preferably of wood, although this is not essential, and said shoes are securely fastened at their inner neutral edges to the extremities of the springs, while at their opposite edges the shoes are beveled or tapered, as at $29^a$, to form the working edges adapted to scrape the bottom of the pan. The relative sizes of the pan and its scraper are not important; but to contribute to the efficiency of the apparatus it is desirable that the scraper shall traverse the entire surface of the pan-bottom. To this end I have contemplated the employment of the pan about four feet long, the construction of the scraper about two feet long, and giving to the bar 10 a stroke or movement of about two feet, whereby the scraper and agitator is caused to traverse the entire surface of the pan-bottom. As before explained, the relative proportions may be varied, and it will be understood that the preceding description is merely an exemplification of one proportion of the parts which may be adopted. The scraper and agitator is of a width corresponding to that of the pan-bottom, and its shoes 28 and 29 are disposed close together, so as to have their working edges present merely a continuous surface, thus contributing to the efficiency of the device.

The scraper and agitator is operatively connected with the reciprocating bar 10 by a carrying-arm 30, which is shown as being forked or bifurcated at the end which is to be fitted on the bar 10, and this forked end of the carrying-arm is provided with collars 31, which are loosely fitted on said bar 10, the collars being provided with clamping-screws 32, which are adapted to bind on the bar and firmly hold the carrying-arm thereon in its adjusted position. At its free end the carrying-arm is constructed with a loop 33, which is curved and fashioned to embrace the central portion of the head-block 26, and between the straight and curved portions of the carrying-arm is provided a tie-bar 34, which is rigidly united to the carrying-arm. A retaining-spring 35 is arranged to bear upon the looped end 33 and the tie-bar of the carrying-arm, for the purpose of holding the carrying-arm in engagement with the head-block of the scraper, and this spring 35 is rigidly but detachably fastened to the head-block by means of a vertical bolt 36, which passes centrally through the spring and is secured to the head-block. I do not desire, however, to strictly confine myself to the specific means for detachably attaching the carrying-arm to the head-block of the scraper. When it is desired to throw the scraper out of service, the spring 35 is released to permit the looped end 33 of the carrying-arm to be disconnected from the head-block of the scraper, and, the screws 32 being released from the bar 10, the carrying-arm 30 may be raised above the scraper and held in such elevated position by tightening one or both of the screws 32. To use the scraper, the carrying-arm is turned on its connection with the reciprocating bar and its looped end is fitted over the head-block. In this adjustment of the carrying-bar an important result is obtained for the purpose of putting the yieldable scraper under pressure. When the carrying-arm is lowered, its looped end is pressed down upon the head-block 26 to deflect the series of springs 27 and force the shoes 28 29 upon the pan-bottom with more or less pressure, and, the desired pressure of the scraper upon the pan having been obtained, the screws 32 are adjusted to clamp the carrying-arm rigidly to the bar 10, whereby the carrying-arm serves not only to actuate the agitator and scraper, but it holds the same under the desired pressure in engagement with the tray-bottom. In the course of my experience I have found that advantageous results are secured by holding the scraper in engagement with the pan under a pressure of about five pounds to the square inch; but under certain conditions of service it is desirable to vary this pressure up to six pounds to the inch. This variation in the pressure is readily attained in my invention by the adjustable connection of the carrying-arm to the reciprocating bar 10, and such adjustable connection of the carrying-arm is also advantageous in that provision is made for throwing the scraper out of service when its curved looped end 33 is detached from the head-block of the scraper.

The operation may be described briefly as follows: The cider from a press or other source of supply is conducted to the pans by a suitable hose or tube, and after the cider has been heated in the pans and the objectionable matter removed from the surface of the cider by skimming with a suitable implement the pulp of the desired kind of fruit is placed in the straining device. This straining device is properly fitted to one of the pans by arranging the horizontal frame upon the end walls of the pan so that the straining device will span the pan, and the pitman 24 is properly connected to one of the arms 14 on the rod or bar 10. As the bar is reciprocated by connection with the driving-disk, the pitman 24 actuates the strainer-agitator 20, and the pulp contained within the strainer-receptacle is forced through the strainer 19 and accumulates in the pan. While the strainer device is on one pan, the scrapers in the other pans may or may not be in service, and this strainer device is fitted successively to each pan of the series, so as to strain the pulp as it is supplied to the pan, the link or pitman 24 for the agitator 20 being adapted for connection with either of the arms 14 on the bar 10. After the strainer has been removed from one pan the carrying-arm 30 for the scraper in said pan is connected with said scraper in a manner described to place the scraper under tension and to positively reciprocate the same in the pan to work the fruit pulp and juice or cider.

By my apparatus the contents of a number of pans may be worked while another pan is being charged with pulp, and thus the operation of manufacturing fruit butter may be carried on continuously in a number of pans, the product being removed from the pans at proper intervals.

In the foregoing description I have designated the reciprocating device for actuating the scrapers and the strainer devices as a "bar;" but it will be understood that the mechanical equivalent of this bar, such as a rod or a tube, may be employed and still be within the scope of the invention. I have also designated the receptacle for the fruit-juice and the pulp as "pans;" but it is evident that a skilled mechanic may substitute trays and other equivalent receptacles without departing from the invention.

I am aware that changes in the form and proportion of parts and in the details of construction may be made by a skilled mechanic without departing from the spirit or sacrificing the advantages of the invention, and I therefore reserve the right to make such modifications as clearly fall within the scope of the invention.

Having thus described the invention, what I claim is—

1. An apparatus for manufacturing fruit butter comprising a series of pans, a series of scraper devices, one for each pan, a strainer provided with a movable element adapted to traverse its foraminous surface, said strainer also having means for holding the same in position on either of the series of pans, a motor common to the series of scrapers, and a detachable connection between said motor and the movable element of the scraper, as and for the purposes described.

2. In an apparatus for manufacturing fruit butter, a series of pans, a scraper mechanism for each pan, a motor for operating said scrapers simultaneously, a strainer provided with means for securing it in either of said pans and with a movable element, and means for adjustably connecting the movable element with the motor when the strainer is in either pan.

3. In an apparatus for manufacturing fruit butter, a series of pans, a removable scraper mechanism for each pan, a motor common to all of said scrapers, a strainer provided with means for securing it in either of said pans, an agitator in the strainer provided with bars adjacent to and movable over the foraminous surface of the strainer, and means for detachably connecting said agitator with said motor when the strainer is in either one of said pans.

4. In an apparatus for the manufacture of fruit butter, the combination of two series of pans, a reciprocating bar mounted between said series of pans for endwise movement longitudinally thereof, the scrapers fitted within the pans to traverse the bottoms thereof, and arms extending from the reciprocating bar and attached to the scrapers, substantially as described.

5. In an apparatus for the manufacture of fruit butter, the combination of a series of pans, a reciprocating bar contiguous thereto, a series of scrapers in said pans, and arms attached to said scrapers and each provided with a clamping device for making the same fast with the reciprocating bar, each arm and scraper being adjustable on the bar independently of the other arms and adapted to be thrown out of operative relation to the pan, substantially as described.

6. In an apparatus for the manufacture of fruit butter, the combination of a series of pans, a reciprocating bar contiguous thereto, a series of carrying-arms each having a clamp for adjustably and detachably connecting the same to the reciprocating bar, and a series of scrapers fastened detachably to the arms and adjustable therewith into or out of operative relation to the pans, substantially as described.

7. In an apparatus for the manufacture of fruit butter, the combination of a pan, a driving device contiguous thereto, a scraper fitted to the bottom of the pan, a yielding arm between the driving device and the scraper, means for varying the tension of said arm, substantially as described.

8. In an apparatus for the manufacture of fruit butter, the combination with a pan, of a scraper, an endwise-movable bar contiguous to the pan, and an adjustable connection between the reciprocating bar and the scraper to regulate pressure of the scraper upon the pan-bottom, substantially as described.

9. In an apparatus for the manufacture of fruit butter, the combination with a pan and a driving device, of a scraper fitted to said pan to travel therein, an arm for connecting the scraper with the driving device, said arm being rigid in a line with the movement of the scraper but yielding in a line at right angles thereto, and means for adjusting the tension of the arm relatively to the scraper to vary the pressure of the latter upon the pan-bottom, substantially as described.

10. In an apparatus for the manufacture of fruit butter, the combination with a pan and a driving device, of a scraper fitted upon the bottom of the pan and adapted to traverse the same, and a flexible carrying-arm detachably connected to the scraper and adjustably clamped to the driving device, and means for varying the tension of the arm or releasing it from the driving device, substantially as described.

11. In an apparatus for the manufacture of fruit butter, the combination with a pan and a driving-bar, of a scraper having a head-block, a carrying-arm fitted to the driving-bar and looped on the head-block of the scraper, a retainer for detachably fastening the looped end of the carrying-arm to the scraper head-block, and means for clamping the carrying-arm rigidly to the driving-bar, substantially as described.

12. In an apparatus for the manufacture of fruit butter, the combination of a series of pans, a single driving-bar, a series of yielding scrapers fitted in said pans to travel therein, and a series of carrying-arms clamped to the driving-bar and attached to the scrapers, each carrying-arm being adjustable on the driving-bar to regulate the pressure of its scraper or to throw the latter out of service independently of every other scraper of the series, substantially as described.

13. An apparatus for manufacturing fruit butter comprising a series of pans, a driving-bar, a series of yielding scrapers fitted in the pans to traverse the same, a series of arms operatively connected with the scrapers and also actuating the common driving-bar to actuate the scrapers, regulate the pressure thereof or throw the same out of service, a strainer device adapted to be fitted interchangeably on either pan of the series, and means between the common driving-bar and a movable element of the strainer device to actuate the latter, substantially as described.

14. An apparatus for manufacturing fruit butter comprising a series of pans, a series of scrapers therein, a common driving-bar operatively connected with said scrapers, a strainer-receptacle having a carrying-frame adapted to be fitted to either of the series of pans, a strainer-agitator hung within the strainer-receptacle to vibrate therein, and a pitman between the common driving-bar and the strainer-agitator, substantially as described.

15. An apparatus for manufacturing fruit butter comprising a series of pans, a series of scrapers therein, a common driving-bar operatively connected with the scrapers and provided with a series of arms, 14, a strainer device adapted to be seated removably upon either of the series of pans and provided with a vibrating agitator, and a pitman connected to the agitator and adapted to be loosely attached to one or the other of the arms, 14, on the driving-bar according to the position of the strainer mechanism in relation to the trays or pans, substantially as described.

16. In an apparatus for the manufacture of fruit butter, a yielding scraper provided with a series of leaf-springs and two series of shoes on the free ends of said leaf-springs, substantially as described.

17. In an apparatus for the manufacture of fruit butter, a yielding scraper comprising a head-block, a series of springs attached centrally thereto, and scraper-shoes secured to the extremities of the springs, substantially as described.

18. In an apparatus for the manufacture of fruit butter, a yielding scraper comprising a head-block, a series of bowed springs fixed to the head-block, and two series of scraper-shoes carried at the terminals of the springs and presenting substantially continuous working edges at both ends of the scraper, substantially as described.

In testimony that I claim the foregoing as my own I have hereto affixed my signature in the presence of two witnesses.

FLAVIUS MOSS.

Witnesses:
   J. W. RATCLIFFE,
   A. C. SHILLING.